(No Model.)
J. & S. W. MILES.
ATTACHMENT FOR PLOWS.
No. 389,820. Patented Sept. 18, 1888.
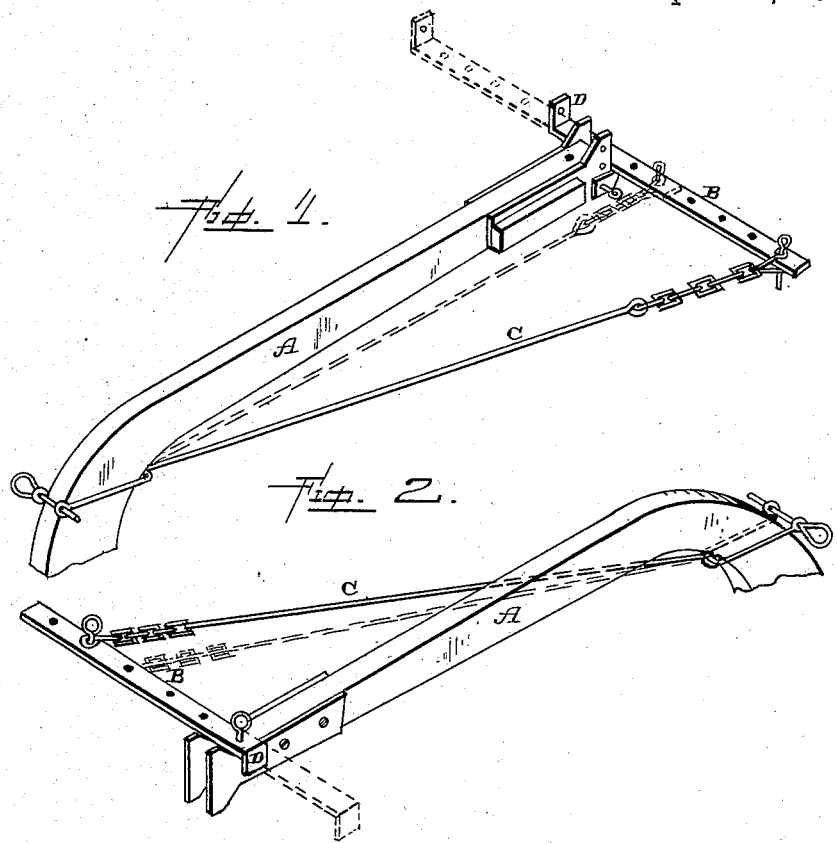
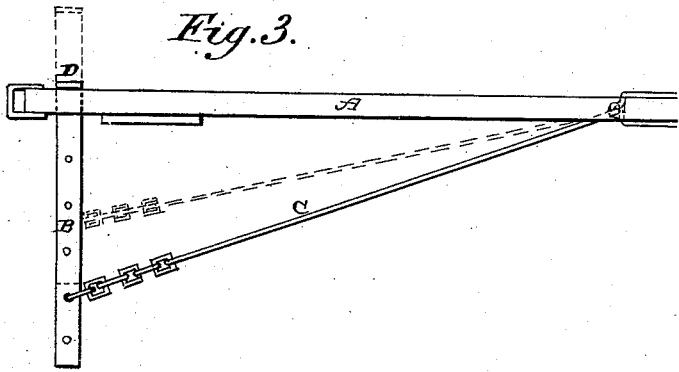

UNITED STATES PATENT OFFICE.

JEREMIAH MILES AND SAMUEL W. MILES, OF CLAY CENTRE, KANSAS.

ATTACHMENT FOR PLOWS.

SPECIFICATION forming part of Letters Patent No. 389,820, dated September 18, 1888.

Application filed May 26, 1888. Serial No. 275,172. (No model.)

*To all whom it may concern:*

Be it known that we, JEREMIAH MILES and SAMUEL W. MILES, of Clay Centre, in the county of Clay and State of Kansas, have invented certain new and useful Improvements in Attachments for Plows; and we do hereby declare the following to be a full, clear, and exact description of the invention, such as will enable others skilled in the art to which it pertains to make and use it, reference being had to the accompanying drawings, which form part of this specification.

Our invention relates to an improvement in attachments for plows; and it consists in a rod, plate, or bar provided with a series of perforations and a turned-up end to catch against the side of the plow-beam, and which is adapted to be attached either directly to the plow-beam or to the clevis attached thereto, and which is braced in position at one end by means of a brace rod or chain, and to which perforated rod or bar the animal is attached, and which bar is to be made reversible and adjustable endwise, all of which will be more fully described hereinafter.

The objects of our invention are to provide an attachment for plows by means of which the animal or animals drawing the plow can be attached thereto so that the single or double trees will not strike against fruit-trees, walls, or other such obstructions, and near to which it is desired to run the plow, and to enable the animals to be driven closer to the edge of a steep hill or embankment, or furrows to be run closer to the edges of steep hills and embankments than it would be safe to drive the animal or animals.

The accompanying drawings represent views of a plow-beam, showing the different manners of attaching our device thereto.

Figure 1 is a perspective view. Fig. 2 is a perspective view from the opposite side. Fig. 3 is a plan view.

A represents an ordinary plow-beam, made of either wood or iron, and which may be provided with clevises or not, just as may be desired. Our attachment consists of a flat bar or rod, B, of any desired length, and which is preferably turned up at its inner end, so as to bear or rest against the side of the beam when connected directly thereto, and which may be attached either to the horizontal portion of the clevis or to the top or the under side of the plow-beam itself, just as may be desired. This bar, rod, or plate may be made of iron, wood, or any other suitable material, and is to be adjusted endwise, according to the distance the furrow is to be run from a tree, wall, or other obstruction, or the distance it is desired that the animal drawing the plow shall walk from the edge of a steep hill or embankment. If the furrow is to be run directly to the foot of a tree or close to a wall, the rod or bar will be adjusted endwise, so that its end will not project beyond the landside of the beam, and then its other end will be supported or braced in position by means of a brace, rod, or chain, C, which is attached at its rear end to the rear portion of the beam. The rod or bar being provided with a series of perforations, the beam can be hitched at any point desired to the rod or bar, so that the single or double trees will not project beyond the landside of the beam. If a vertical and horizontal clevis is used, as here shown, this rod or bar B may be attached directly to the horizontal portion of the clevis, and then the team will be attached to the rod or bar at any of the holes between the clevis and the outer end of the rod or bar. If no clevis is used, as here shown, the bar may be applied either to the top of the beam, having its angular end D turned downward, so as to bear against the side of the beam, or to the under side of the beam and have its angular end turned upward, so as to bear against the side of the beam, according to the depth of the furrow which is to be turned.

Where the furrow is to be run close to the edge of a steep hill or embankment, and where it would not be safe for the animals to walk, they are attached to the bar as far away as possible from the mold-board side of the beam, and then the furrow can be run along the brow or edge of the hill or embankment. The bar can be adjusted endwise or reversed, so that the team can be made to walk on either side of the beam, as may be desired. If the furrow is to be thrown away from the trees or other obstructions, then the bar will be made to extend in the direction of the mold-board side of the beam; but if the furrow is to be drawn toward the tree or object then the rod or bar will be reversed and the animals will be made to walk beyond the landside of the beam.

Heretofore in plowing among fruit-trees and close to walls or other obstructions the singletrees strike against the trees and injure them if some one is not near at hand to raise them up as they pass by each tree, or the furrow cannot be run close to a wall or other obstruction, because the singletree will not allow the animal to walk close to it. By using a perforated rod or bar, as here shown, the animal can be made to walk any desired distance to either side of the beam, and thus allow the furrow to be thrown either toward or away from the trees or objects, just as may be desired, as well as enabling furrows to run where it would not be safe for the team to walk.

Having thus described our invention, we claim—

The combination, with the plow-beam, of a flat perforated endwise adjustable and reversible bar or rod having one of its ends turned at right angles, so as to catch against the side of the beam, and a brace-rod which is connected to the beam at one end and to the bar at the other, substantially as set forth.

In testimony whereof we affix our signatures in presence of two witnesses.

JEREMIAH MILES.
SAMUEL W. MILES.

Witnesses:
  WM. SHARPE,
  C. W. LINDNER.